US009541457B2

(12) United States Patent
Oya et al.

(10) Patent No.: US 9,541,457 B2
(45) Date of Patent: Jan. 10, 2017

(54) METHOD OF ESTIMATING MAGNET TEMPERATURE FOR ROTARY ELECTRIC MACHINERY

(71) Applicant: HONDA MOTOR CO., LTD., Tokyo (JP)

(72) Inventors: Satoyoshi Oya, Utsunomiya (JP); Yuta Ito, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 545 days.

(21) Appl. No.: 14/062,713

(22) Filed: Oct. 24, 2013

(65) Prior Publication Data

US 2014/0126607 A1    May 8, 2014

(30) Foreign Application Priority Data

Nov. 2, 2012    (JP) .................................. 2012-243058

(51) Int. Cl.
   *G01K 7/42*    (2006.01)
   *G01K 7/36*    (2006.01)
   *G01K 13/08*   (2006.01)

(52) U.S. Cl.
   CPC ................. *G01K 7/36* (2013.01); *G01K 7/427* (2013.01); *G01K 13/08* (2013.01); *G01K 2205/00* (2013.01)

(58) Field of Classification Search
   CPC ............................ H02P 29/0066; G01K 7/424
   See application file for complete search history.

(56) References Cited

U.S. PATENT DOCUMENTS

| 6,579,202 | B2* | 6/2003 | El-Antably | B60K 6/26 184/6.12 |
| 7,214,155 | B2* | 5/2007 | Mueller | B60K 7/0007 180/65.51 |
| 7,955,208 | B2* | 6/2011 | Kinoshita | B60K 17/346 475/150 |
| 8,435,149 | B2* | 5/2013 | Koyama | B25J 9/102 475/162 |
| 8,561,775 | B2* | 10/2013 | Osawa | B60K 6/40 192/110 B |
| 2009/0284202 | A1 | 11/2009 | Miura | |
| 2011/0057522 | A1* | 3/2011 | Blessing | B60K 6/26 310/61 |
| 2012/0226483 | A1* | 9/2012 | Berry | B60L 3/0061 703/2 |
| 2013/0169073 | A1 | 7/2013 | Nagahama et al. | |

FOREIGN PATENT DOCUMENTS

| JP | 2000-023421 A | 1/2000 |
| JP | 2005-073333 A | 3/2005 |
| JP | 4102177 B2 | 6/2008 |
| JP | 2009-171640 A | 7/2009 |
| JP | 4572907 B2 | 11/2010 |
| WO | 2012/046307 A1 | 4/2012 |

OTHER PUBLICATIONS

Japanese Office Action dated Jul. 15, 2014, issued in corresponding Japanese Patent Application No. 2012-243058, w/English translation (3 pages).

\* cited by examiner

*Primary Examiner* — Minh Phan
*Assistant Examiner* — Leon W Rhodes, Jr.
(74) *Attorney, Agent, or Firm* — Westerman, Hattori, Daniels & Adrian, LLP

(57) ABSTRACT

A magnet temperature calculator estimates a magnet temperature of a rotary electric machine using at least param- (Continued)

eters related to a transmission that is coupled to the rotary electric machine.

12 Claims, 13 Drawing Sheets

METHOD OF ESTIMATING MAGNET TEMPERATURE FOR ROTARY ELECTRIC MACHINERY

CROSS-REFERENCE TO RELATED APPLICATION

This application is based upon and claims the benefit of priority from Japanese Patent Application No. 2012-243058 filed on Nov. 2, 2012, the contents of which are incorporated herein by reference.

BACKGROUND OF THE INVENTION

Field of the Invention

The present invention relates to a method of estimating the temperature of magnets (hereinafter referred to as a "magnet temperature") on a rotating member of a rotary electric machine.

Description of the Related Art

Rotary electric machines include a rotor and a stator that include magnets. When the temperatures of the rotor and the stator exceed a threshold temperature, the magnets start to become demagnetized. Therefore, it is necessary to appropriately manage the temperatures of the rotor and the stator in order to prevent the rotor and the stator from exceeding the threshold temperature. In order to carry out such temperature management, it is desirable to directly detect the temperatures of the rotor and the stator.

The temperature of the stator can easily be detected since the stator is fixed to the machine casing. However, since the rotor is a rotating member, it is more complicated to detect the temperature of the rotor. More specifically, the temperature of the rotor needs to be detected by reading a detection signal from a temperature sensor, which is mounted on the rotor through a slip ring, or on a rotary connector that is mounted on the shaft of the rotor. The mechanism for detecting the temperature of the rotor makes the rotary electric machine complex in structure and costly to manufacture.

Japanese Patent No. 4572907 discloses that the rotational speed of the rotor of a motor, the temperature of the stator coils of the motor, and the temperature of a coolant for cooling the stator of the motor are detected, and the temperatures of the magnets (magnet temperatures) on the rotor and the stator are estimated based on operating points (a torque command value and the rotational speed of the rotor) of the motor, the detected temperatures, and a thermal model between the magnets on the rotor and the stator.

SUMMARY OF THE INVENTION

For installing a rotary electric machine on an electric vehicle, it is desirable to connect the transmission of the vehicle and the rotor of the rotary electric machine to each other, as well as to use a lubricating oil of the transmission as a coolant for the rotor. When lubricating oil is scattered upon rotation of the gears of the transmission, the scattered lubricating oil is applied to the rotor of the rotary electric machine and transfers heat to the rotor, possibly changing, i.e., increasing or decreasing, the temperature of the rotor including the magnets thereof.

For example, losses caused in the transmission, i.e., slippage loss (meshing loss) due to slippage between meshing gears, and frictional loss due to friction between contacting surfaces of the meshing gears, are converted into heat. Such heat is transferred to the lubricating oil, and the heated lubricating oil is scattered onto the rotor. The lubricating oil, which is applied to the rotor, transfers heat to the magnets of the rotor, thereby raising the temperature of the magnets.

According to the technology disclosed in Japanese Patent No. 4572907, however, the magnet temperature is estimated based on operating points of the motor, the detected temperature of the stator coils, the temperature of the coolant, and a thermal model between the magnets on the rotor and the stator. Nothing is taken into consideration concerning the effect that lubricating oil, which is scattered from the transmission and applied to the rotor, has on the magnet temperature. Therefore, the magnet temperature estimated by the technology disclosed in Japanese Patent No. 4572907 tends to deviate significantly from the actual magnet temperature, and hence the accuracy with which the magnet temperature is estimated is likely to be low.

It is an object of the present invention to provide a method of accurately estimating the magnet temperature of magnets on a rotating member of a rotary electric machine.

To achieve the aforementioned object, in accordance with the present invention, a power transmitting mechanism is disposed near a rotary electric machine, and when the rotary electric machine is cooled by a fluid that lubricates the power transmitting mechanism, a magnet temperature estimator estimates the temperature of magnets using at least parameters related to the power transmitting mechanism.

If the rotary electric machine is incorporated in a vehicle such as a hybrid vehicle or an electric vehicle, as described above, then when fluid is scattered from a power transmitting mechanism such as a transmission and the fluid is applied to a rotating member of the rotary electric machine, the temperature of the rotating machine including the magnet temperature is changed (increased or decreased). According to the present invention, the magnet temperature is estimated based on the above parameters related to the power transmitting mechanism, which take into consideration the heat of the fluid that is scattered and applied to the rotating member. In this manner, any deviation of the estimated magnet temperature from the actual magnet temperature is minimized, thus making it possible to estimate the magnet temperature more accurately.

Since the magnet temperature is estimated with increased accuracy, it is possible to lower the heat resistance (demagnetization resistance) of the magnets and to reduce the coercive force of the magnets. Consequently, the amount of dysprosium (Dy) contained in the magnets can be reduced. It is thus possible to manufacture a rotary electric machine that meets various specifications and in which the magnets thereof are less expensive.

The rotary electric machine may be controlled by a control system, wherein the rotary electric machine needs to enter a power save mode each time that the magnet temperature approaches a limit temperature (upper limit temperature). In such a control system, since the accuracy with which the magnet temperature is estimated is increased, the power save mode is prevented from being carried out unnecessarily, and the frequency at which the rotary electric machine enters the power save mode is lowered. As a result, fuel consumption of the vehicle is reduced during times that the vehicle is subjected to high loads, and the drivability and commercial value of the vehicle are increased.

Details concerning parameters related to the power transmitting mechanism, and a specific method of estimating the magnet temperature using such parameters, will be described below.

[1] Parameters related to the power transmitting mechanism include a loss caused by the power transmitting mechanism, and a loss calculator calculates the loss caused by the power transmitting mechanism. More specifically, the loss caused by the power transmitting mechanism is converted into heat, which is transferred to the fluid that lubricates the power transmitting mechanism. When the fluid is scattered and applied to the rotating member, heat is transferred from the applied fluid to the rotating member. As a result, the temperature of the rotating member including the magnet temperature is changed. If the magnet temperature is estimated while taking into consideration the loss caused by the power transmitting mechanism, which is related to the heat of the fluid scattered and applied to the rotating member, then the magnet temperature can be estimated with increased accuracy.

[2] If the loss caused by the power transmitting mechanism includes a meshing loss caused by gears of the power transmitting mechanism, then the loss calculator calculates the meshing loss caused by the gears. More specifically, the meshing loss caused by the gears is converted into heat, which is transferred to the fluid. Thereafter, when the fluid is scattered upon rotation of the gears and applied to the rotating member, heat is transferred from the applied fluid to the rotating member. As a result, the temperature of the rotating member including the magnet temperature is changed. If the magnet temperature is estimated while taking into consideration the meshing loss caused by the gears, which is related to the heat of the fluid scattered and applied to the rotating member, then deviation of the estimated magnet temperature from the actual magnet temperature can further be minimized.

[3] Parameters related to the power transmitting mechanism include a torque that acts on the power transmitting mechanism, and the loss calculator calculates the meshing loss based on the torque. More specifically, since the gears rotate under the torque, the meshing loss, which is related to the heat of the fluid applied to the rotating member, can accurately be calculated when the meshing loss is calculated based on the torque.

[4] If the power transmitting mechanism is coupled to the rotating member, the loss calculator may calculate the torque based on the value of a current flowing through the rotary electric machine.

More specifically, when the rotary electric machine operates as a motor, since the rotating member of the motor rotates depending on a current supplied to the motor from an external circuit, a rotational axis of the power transmitting mechanism, which is coupled to the rotating member, also rotates. When the rotary electric machine operates as a generator, the rotary electric machine generates a current upon rotation of the rotating member, which is caused by rotation of the rotational shaft, and the generated current is supplied to an external circuit. The loss calculator can easily and accurately calculate the meshing loss by calculating the torque, which is based on the value of the current.

[5] The loss caused by the power transmitting mechanism includes a frictional loss due to friction in the power transmitting mechanism, and the loss calculator calculates the frictional loss caused by the power transmitting mechanism. More specifically, the frictional loss is converted into heat, which is transferred to the fluid. Thereafter, when the fluid is scattered and applied to the rotating member, heat is transferred from the applied fluid to the rotating member, thereby changing the temperature of the rotating member including the magnet temperature. If the magnet temperature is estimated while taking into consideration frictional loss, which is related to the heat of the fluid that is scattered and applied to the rotating member, then deviation of the estimated magnet temperature from the actual magnet temperature can further be minimized.

[6] In connection with the foregoing feature [5], the loss calculator may calculate the frictional loss based on rotational speeds of the gears. More specifically, when the gears rotate, frictional loss occurs in various parts of the power transmitting mechanism, which include peripheral regions of the gears. As the rotational speeds of the gears increase, frictional loss increases, thereby increasing the heat transferred to the fluid. Consequently, the loss calculator can easily and accurately calculate frictional loss by taking into account rotational speeds that are related to the heat of the fluid.

[7] If the power transmitting mechanism is coupled to the rotating member, the loss calculator may calculate the frictional loss based on a rotational speed of the rotating member, which depends on the rotational speeds of the gears. More specifically, when the rotating member rotates, the rotational shaft of the power transmitting mechanism, which is coupled to the rotating member, and the gears that are operatively connected to the rotational shaft also rotate. Thus, the loss calculator can easily and accurately calculate the frictional loss based on the rotational speed of the rotating member, which depends on the rotational speeds of the gears.

[8] Parameters related to the power transmitting mechanism include an amount of fluid that is scattered from the power transmitting mechanism and applied to the rotating member. A dissipation heat calculator calculates a quantity of heat dissipated from the magnets by the fluid applied to the rotating member, based on the scattered amount of fluid and the loss caused by the power transmitting mechanism, and the magnet temperature estimator estimates the magnet temperature based on the calculated quantity of heat dissipated from the magnets. Accordingly, deviation of the estimated magnet temperature from the actual magnet temperature can further be minimized by taking into account the quantity of heat dissipated from the magnets.

[9] In connection with the foregoing feature [8], the dissipation heat calculator may calculate the scattered amount of fluid based on the rotational speeds of the gears. As described above, since the fluid is scattered upon rotation of the gears, the scattered amount of fluid can easily and accurately be calculated by taking into consideration the rotational speeds of the gears.

[10] If the power transmitting mechanism is coupled to the rotating member, then the dissipation heat calculator may calculate the scattered amount of fluid based on a rotational speed of the rotating member, which depends on the rotational speeds of the gears. More specifically, when the rotating member rotates, a rotational shaft of the power transmitting mechanism, which is coupled to the rotating member, and the gears that are operatively connected to the rotational shaft also rotate. Thus, the loss calculator can easily and accurately calculate frictional loss based on the rotational speed of the rotating member, which depends on the rotational speeds of the gears.

If the power transmitting mechanism is disposed radially inward of the rotating member, which is provided as an inner rotor in the rotary electric machine, then the temperature of the rotating member including the magnet temperature is changed significantly by the fluid, which is scattered from the power transmitting mechanism. Even with such a structure, by applying the features of the present invention thereto, the various advantages described above according to the present invention can be obtained.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A method of estimating a magnetic temperature according to a preferred embodiment of the present invention will be described in detail below with reference to FIGS. 1 through 13.

[General Structure of Vehicle that Incorporates a Rotary Electric Machine Therein]

A magnet temperature estimating apparatus 10 (see FIG. 5), which carries out the method of estimating a magnetic temperature according to the present embodiment, serves as an apparatus for estimating the temperature $T_{MAG}$ of magnets 16 (hereinafter referred to as a "magnet temperature $T_{MAG}$") on a rotor (rotating member) 14 of a rotary electric machine 12. The rotary electric machine 12, which includes magnets 16 the temperature of which is to be estimated, is incorporated in a vehicle 18 such as a hybrid vehicle or an electric vehicle.

Figure 5:
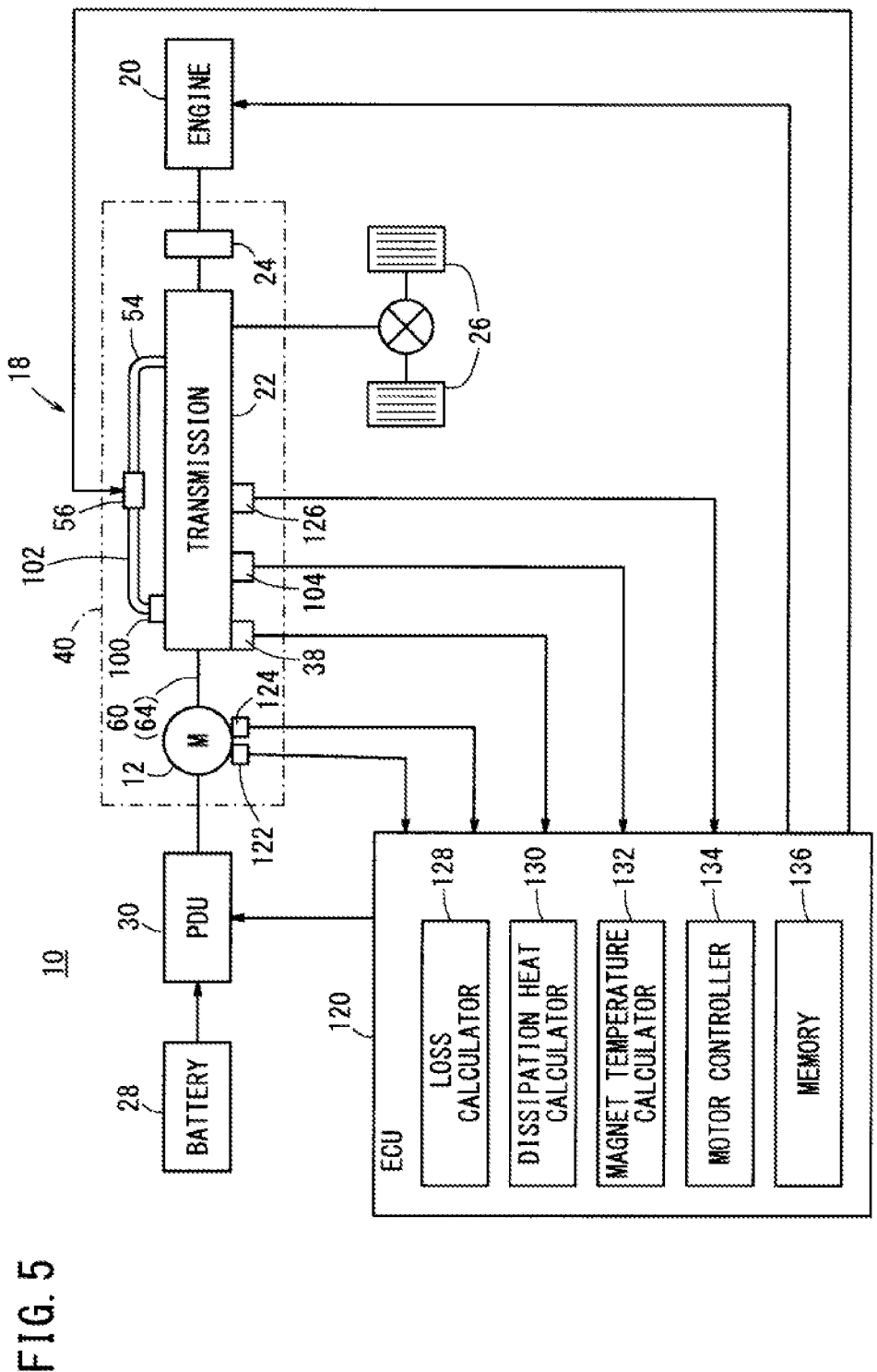
FIG. 5 is a block diagram of a magnet temperature estimating apparatus according to an embodiment of the present invention.

FIG. 5 shows the vehicle 18 in the form of a hybrid vehicle, for example. The vehicle 18 has an engine 20 and a transmission 22, with a clutch 24 disposed between the engine 20 and the transmission 22. The transmission 22, which serves as a power transmitting mechanism, is an automatic transmission as a drive source for transmitting drive power from the engine 20 or the rotary electric machine 12 to drive wheels 26 in order to propel the vehicle 18.

Figure 1:
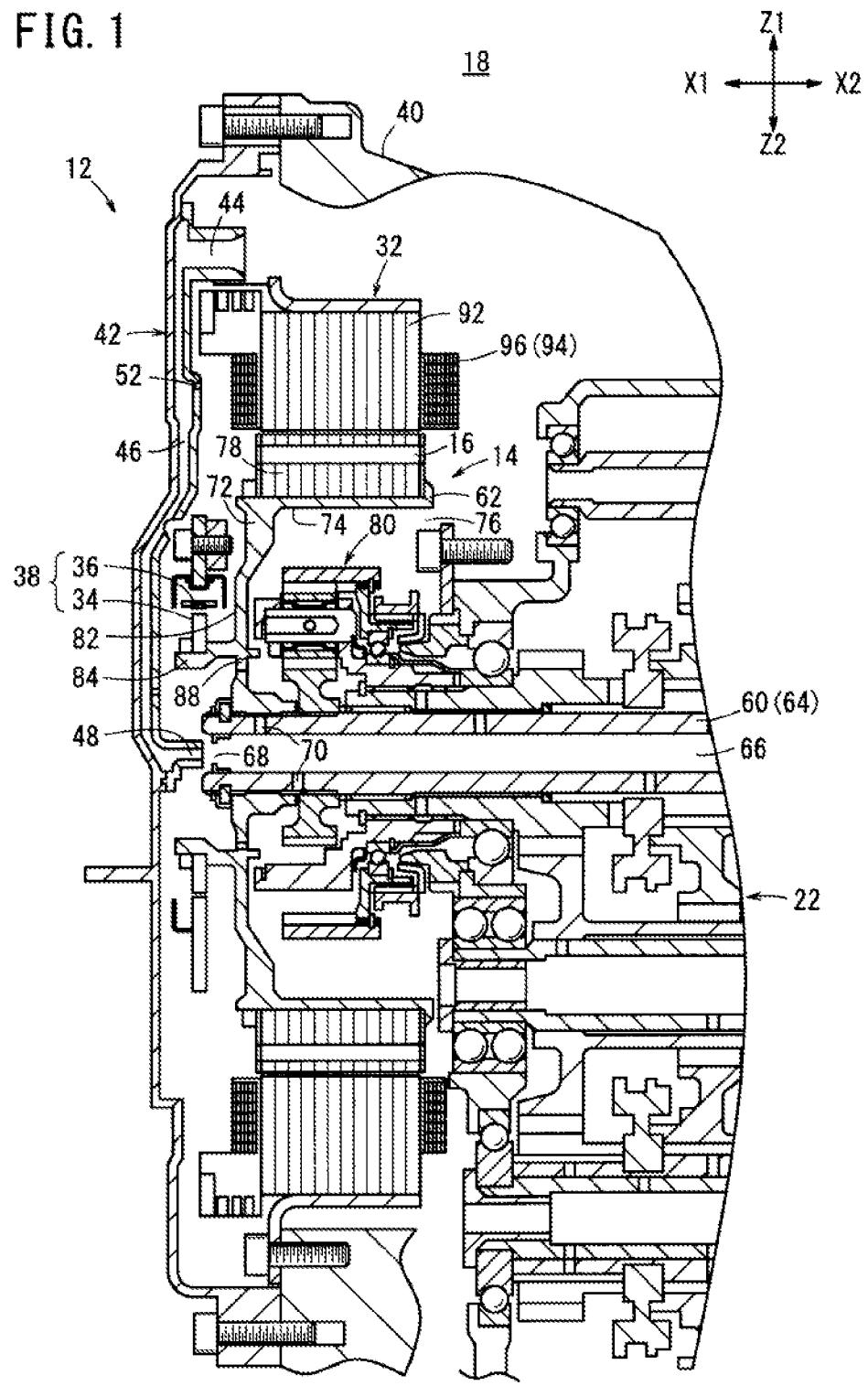
FIG. 1 is a fragmentary cross-sectional view of the cooling system of a vehicle that incorporates a rotary electric machine therein.
Figure 2:
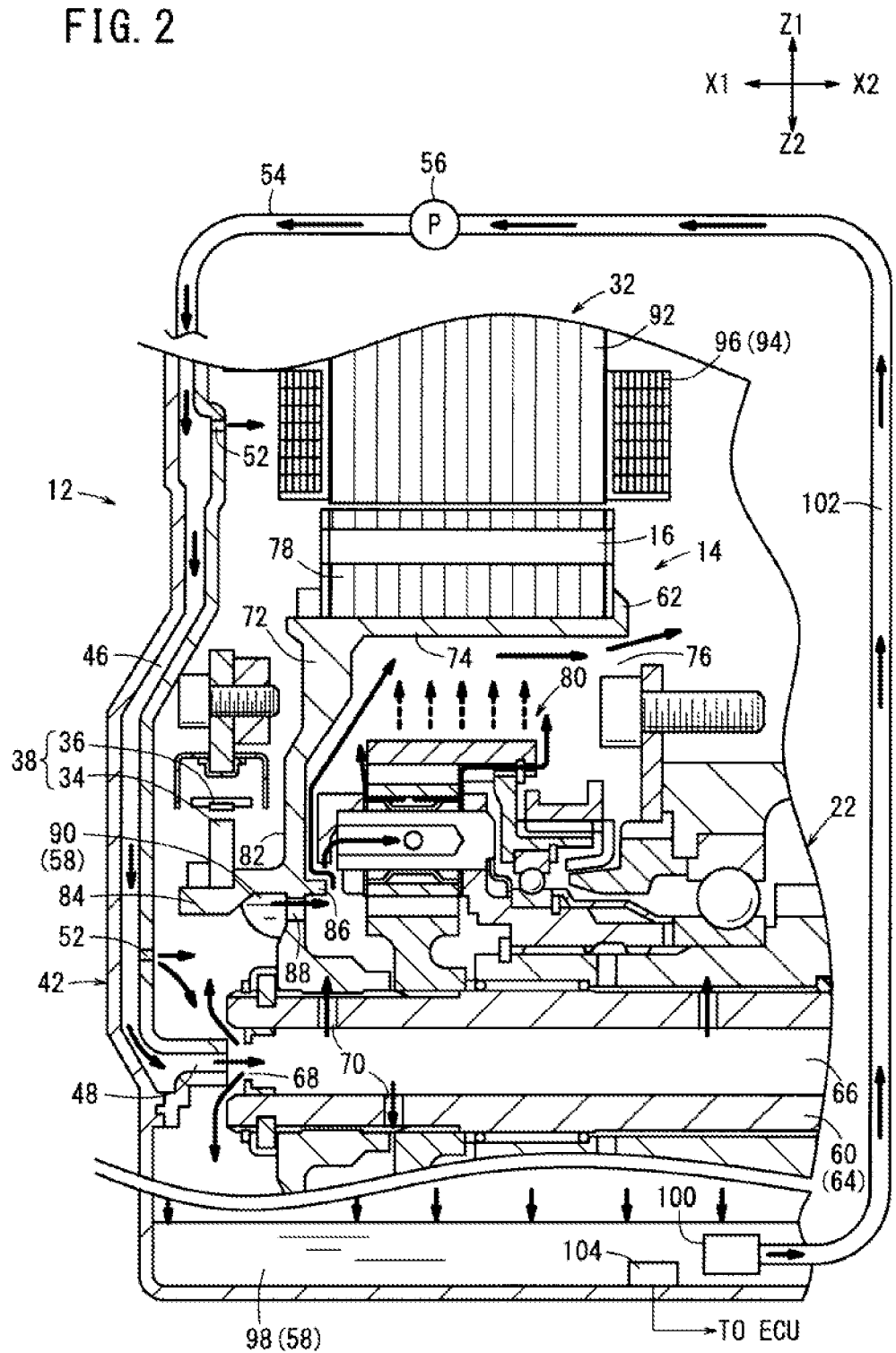
FIG. 2 is a fragmentary cross-sectional view showing flows of a coolant in the rotary electric machine shown in FIG. 1.

According to the present embodiment, as shown in FIGS. 1 and 2, the transmission 22 includes a portion disposed radially inward of the rotor 14 of the rotary electric machine 12.

The rotary electric machine 12, which comprises a three-phase AC brushless motor, for example, generates drive power for propelling the vehicle 18 based on electric power supplied from a battery 28 through a PDU (Power Drive Unit) 30. Further, when the vehicle 18 operates in a regenerative mode, the rotary electric machine 12 regenerates electric power and supplies the regenerated electric power through the PDU 30 to the battery 28, thereby charging the battery 28.

According to the present embodiment, a method of estimating a magnetic temperature $T_{MAG}$ is applied to a type of rotary electric machine known as an IPM (Internal Permanent Magnet) motor, which includes a magnet-embedded rotor, i.e., a rotor with permanent magnets embedded therein. The method of estimating the magnetic temperature $T_{MAG}$ according to the present embodiment may also be applied to a type of rotary electric machine known as an SPM (Surface Permanent Magnet) motor, which includes a rotor with permanent magnets mounted on the surface thereof.

Prior to describing the magnet temperature estimating apparatus 10, the rotary electric machine 12, which is incorporated in the vehicle 18, will be described below with reference to FIGS. 1 through 4.

The rotary electric machine 12 includes a rotor 14 serving as an inner rotor, a stator 32 disposed around the rotor 14, and a resolver (rotational speed sensor) 38 having a resolver rotor 34 and a resolver stator 36. The rotary electric machine 12 is accommodated in a housing 40, and the housing 40 is closed by a side cover 42.

Figure 3:
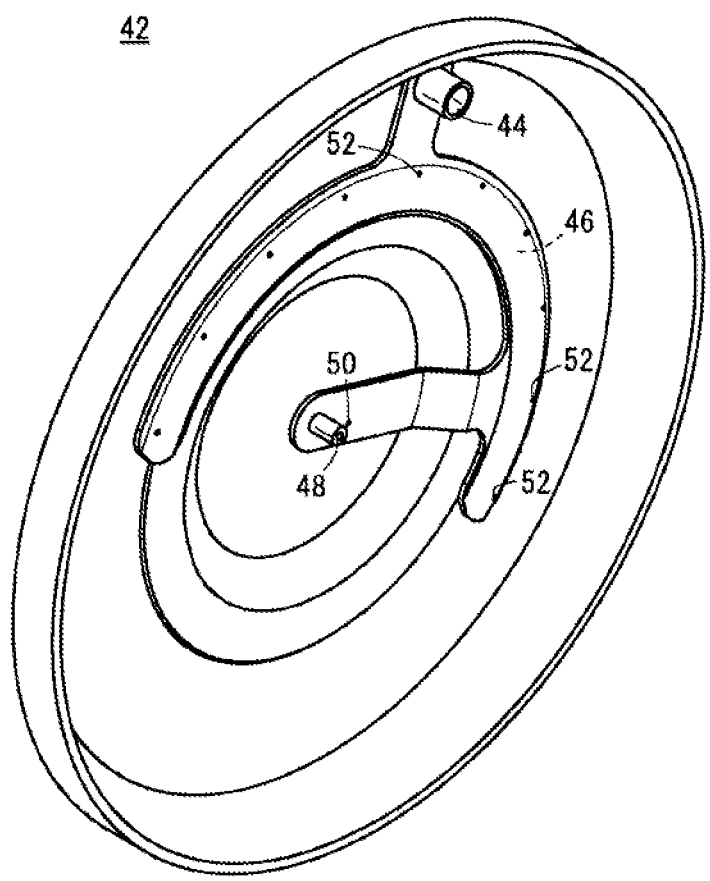
FIG. 3 is a perspective view of a side cover that functions as part of the cooling system shown in FIG. 1.

As shown in FIGS. 1 through 3, the side cover 42 comprises a disk-shaped lid covering the rotary electric machine 12 that is accommodated in the housing 40. The side cover 42 includes a single inlet hole 44, a fluid passage 46, a single first outlet hole 48, a single second outlet hole 50, and a plurality of third outlet holes 52. The inlet hole 44 is connected to a fluid passage 54, and a coolant (fluid) 58 is supplied to the inlet hole 44 from a pump 56 through the fluid passage 54.

The coolant 58 preferably is a lubricating oil for lubricating the transmission 22. An ATF (Automatic Transmission Fluid) may be used as the coolant 58. The pump 56 may either be an electric pump or a mechanical pump. The coolant 58 is supplied from the pump 56 through the inlet hole 44 to the fluid passage 46 at times that the rotor 14 is rotated during operation of the rotary electric machine 12 and the transmission 22. As shown in FIG. 2, the solid-line arrows indicate flows of the coolant 58 in the vehicle 18.

The first, second, and third outlet holes 48, 50, 52, which are in the form of nozzles, eject or discharge the coolant 58 supplied from the pump 56 through the fluid passage 54, the inlet hole 44, and the fluid passage 46 toward the rotor 14 and the stator 32. More specifically, the first outlet hole 48 primarily ejects or discharges the coolant 58 toward a rotational shaft 60 of the rotor 14. The second outlet hole 50 primarily ejects or discharges the coolant 58 toward a bottomed tubular member 62 of the rotor 14. The third outlet holes 52 primarily eject or discharge the coolant 58 toward the stator 32.

As described above, the transmission 22 is a portion disposed radially inward of the rotor 14 of the rotary electric machine 12. According to the present embodiment, the transmission 22 comprises a shaft 64, a portion of which is positioned within the rotary electric machine 12 and serves as the rotational shaft 60 of the rotor 14. In other words, the rotor 14 including the magnets 16 and the shaft 64 of the transmission 22 are coupled integrally to each other.

The rotational shaft 60, i.e., the shaft 64, is in the form of a tubular member having a first axial fluid passage 66 defined therein, which extends along an axial direction indicated by the arrows X1, X2 in FIGS. 1 and 2. The first axial fluid passage 66 has an axial opening 68 defined in one end thereof, which faces the first outlet hole 48. The axial opening 68 is held in fluid communication with the first axial fluid passage 66, for guiding the coolant 58 that is ejected or discharged from the first outlet hole 48 into the first axial fluid passage 66. The rotational shaft 60 has a plurality of second axial fluid passages 70, which are defined radially in a circumferential wall thereof, and which keep the first axial fluid passage 66 in fluid communication with a space surrounding the rotational shaft 60.

When the coolant 58 is ejected or discharged from the first outlet hole 48 through the axial opening 68 into the first axial fluid passage 66, the coolant 58 is discharged radially from the rotational shaft 60 through the second axial fluid passages 70. The discharged coolant 58 flows into the rotor 14, or is supplied to a portion of the transmission 22, e.g., a planetary gear mechanism 80, to be described later.

The bottomed tubular member 62 of the rotor 14 is mounted in a substantially coaxial manner on the rotational shaft 60. The bottomed tubular member 62 has a bottom 72, which is fixed to the outer circumferential surface of the rotational shaft 60 near the side cover 42, and an annular side wall 74, which extends from an outer edge of the bottom 72 in the axial direction indicated by the arrow X2. The bottom 72 and the annular side wall 74 jointly define an opening 76, which opens in the axial direction indicated by the arrow X2. The planetary gear mechanism 80 of the transmission 22 is accommodated in the opening 76. A rotor yoke 78 of the rotor 14 is disposed together with the magnets 16 on an outer circumferential surface of the side wall 74.

The bottom 72 includes a base 82, a first protruding wall 84 that projects from the base 82 toward the side cover 42, and a second protruding wall 86 that projects from the base 82 toward the transmission 22. The base 82 extends radially in the radial direction, as indicated by the arrows Z1, Z2 in FIGS. 1 and 2, and includes a plurality of through holes 88 defined axially therein along the axial direction indicated by the arrows X1, X2. When the coolant 58 is ejected from the side cover 42 toward the bottom 72, the coolant 58 flows through the through holes 88 into the tubular member 62, i.e., the opening 76.

The base 82 and the first protruding wall 84 jointly define a space in the vicinity of the through holes 88. The space serves as a reservoir 90 for keeping the coolant 58 under centrifugal forces generated when the rotor 14 rotates. Therefore, initially, even if the coolant 58 does not enter directly into the through holes 88, the coolant 58 is maintained temporarily in the reservoir 90, and thereafter the coolant 58 flows through the through holes 88 into the opening 76. Furthermore, since the first protruding wall 84 projects to a position near the side cover 42, even if the coolant 58 in the first axial fluid passage 66 overflows the axial opening 68, the overflowing coolant 58 flows from the inner circumferential surface of the first protruding wall 84, through the reservoir 90 and the through holes 88, and into the opening 76 under gravitational forces, or under centrifugal forces that are generated when the rotor 14 rotates.

The base 82 and the first protruding wall 84 have oblique surfaces that make an inlet area of the reservoir 90, which is supplied with the coolant 58, progressively greater in diameter in the axial direction indicated by the arrow X2. The inlet area of the reservoir 90, which spreads radially outward, allows the coolant 58 to be kept easily in the reservoir 90, and is effective to reduce the amount of coolant 58 that does not flow through the through holes 88 into the opening 76.

As described above, the planetary gear mechanism 80 is accommodated in the opening 76. The coolant 58, which is introduced through the through holes 88, is guided by the second protruding wall 86, and then the coolant 58 is discharged radially outward under centrifugal forces generated upon rotation of the rotor 14. A portion of the coolant 58, which is discharged radially outward, is supplied to the planetary gear mechanism 80.

The coolant 58 introduced into the opening 76, i.e., the coolant 58 that flows through the through holes 88 and the coolant 58 that is discharged through the second axial fluid passages 70, moves along the side wall 74 as the rotor 14 rotates, thereby cooling the rotor yoke 78. Since the magnets 16 are embedded in the rotor yoke 78, the coolant 58 that moves along the side wall 74 cools the magnets 16 through the side wall 74 and the rotor yoke 78. Consequently, heat generated in the magnets 16 upon rotation of the rotor 14 is radiated through the rotor yoke 78, the side wall 74, and the coolant 58.

The stator 32 comprises an annular member, which is spaced radially from the rotor 14 by a predetermined air gap, along the directions indicated by the arrows Z1, Z2. The stator 32 includes a stator core 92 and coils 96 comprising conductive wires 94 wound around the stator core 92. The coolant 58, which is supplied from the third outlet holes 52 of the side cover 42, cools components of the stator 32.

According to the present embodiment, the coolant 58 that cools the rotor 14 and the stator 32, and the coolant 58 that lubricates and cools the planetary gear mechanism 80 of the transmission 22 drop by gravity into an oil pan (drain) 98 at the bottom of the housing 40, and the coolant 58 is maintained in the oil pan 98. When the pump 56 is actuated, the coolant 58 maintained in the oil pan 98 is filtered by a strainer 100. The strainer 100 is connected to the pump 56 by a fluid passage 102. Therefore, the coolant 58, after being filtered by the strainer 100, flows through the fluid passage 102 into the pump 56, and then flows through the fluid passage 54 into the side cover 42. Consequently, when the pump 56 is actuated, the coolant 58 maintained in the oil pan 98 is used again to cool the rotor 14 and the stator 32, as well as to lubricate and cool the transmission 22.

As described above, when the rotor 14 rotates upon operation of the rotary electric machine 12 and the transmission 22, the pump 56 circulates the coolant 58 through the cooling system shown in FIG. 2 in order to supply the coolant 58 to the side cover 42. The rotational speed of the pump 56 preferably is commensurate with the rotational speed $N_{MOT}$ of the rotor 14. A temperature sensor 104 is mounted on the bottom of the oil pan 98 near the strainer 100 for detecting a temperature $T_{IN}$ (hereinafter referred to as a "sensing temperature $T_{IN}$") of the coolant 58 maintained in the oil pan 98. Since the coolant 58 maintained in the oil pan 98 is circulated and supplied to the side cover 42 by the pump 56, the sensing temperature $T_{IN}$, which is detected by the temperature sensor 104, represents the temperature of the coolant 58 immediately before the coolant is supplied to the rotor 14 and the transmission 22.

The resolver rotor 34 is fixed to the first protruding wall 84 of the rotor 14. The resolver stator 36 is fixed to the stator 32 in a radially outward spaced relation to the resolver rotor 34. The resolver stator 36 detects an angular displacement of the resolver rotor 34, i.e., an angular displacement of the rotor 14. It is possible to calculate the rotational speed $N_{MOT}$ of the rotor 14, i.e., the rotational shaft 60 thereof, using the angular displacement that is detected by the resolver stator 36.

Figure 4:
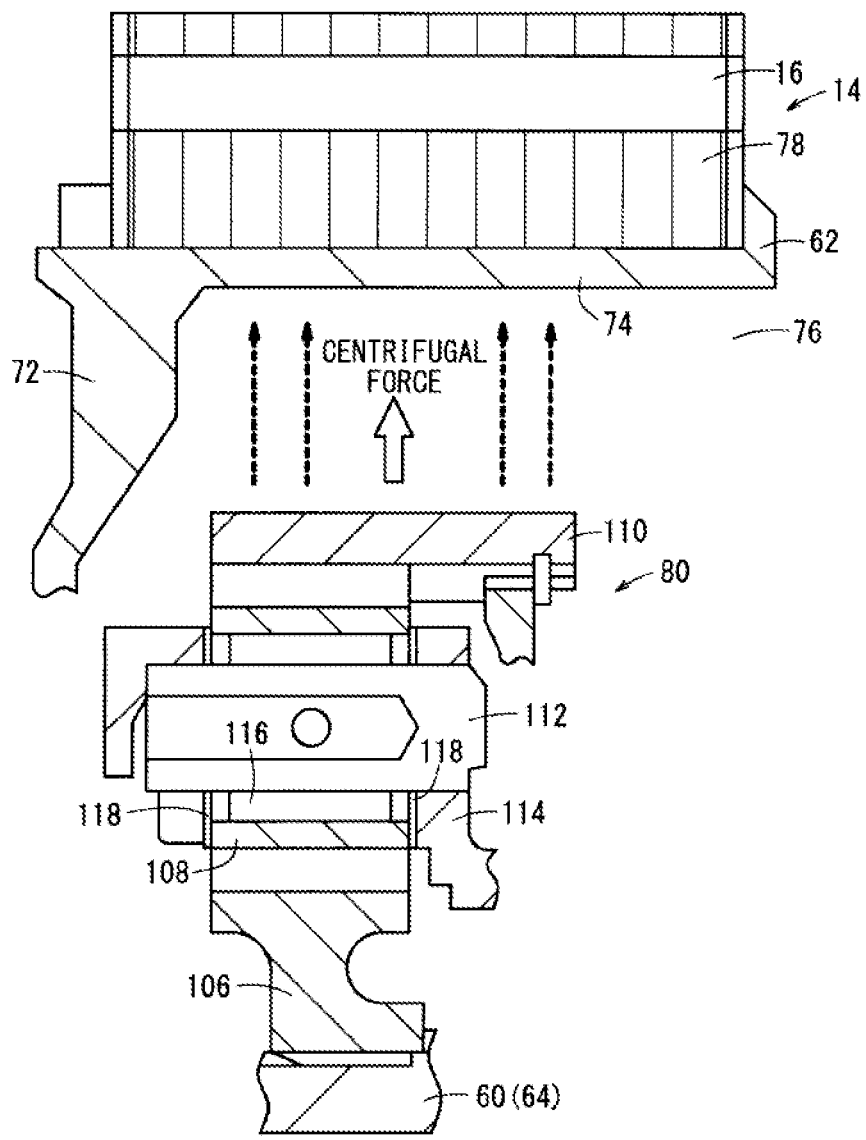
FIG. 4 is an enlarged fragmentary cross-sectional view of a planetary gear mechanism, which is disposed radially inward of a rotor shown in FIGS. 1 and 2.

As shown in FIGS. 1, 2, and 4, the planetary gear mechanism 80 includes a sun gear 106, which is fixed substantially coaxially to the rotational shaft 60, a plurality of planet gears 108 that function as pinion gears held in mesh with the sun gear 106, a ring gear 110 that functions as an outer gear held in mesh with the planet gears 108, and a planetary carrier 114 interconnecting respective gear shafts 112 of the planet gears 108.

Bearings 116 are interposed between the gear shafts 112 and the planet gears 108. More specifically, the bearings 116 are fixedly mounted on outer circumferential surfaces of the respective gear shafts 112. Further, the planet gears 108 are rotatably mounted on the respective gear shafts 112 and rotate about axes thereof upon rotation of the sun gear 106. Thrust washers 118 are inserted between ends of the bearings 116 and the planet gears 108 in directions of the arrows X1, X2 and corresponding surfaces of the planetary carrier 114, for thereby minimizing play in the bearings 116 and the planet gears 108 in the directions of the arrows X1, X2.

When the rotational shaft 60 rotates about its own axis, the sun gear 106 rotates about its own axis, thereby rotating the planet gears 108 about axes that are held in mesh with the sun gear 106. Rotation of the planet gears 108 causes the ring gear 110 to rotate about its own axis. The rotational speed $N_{MOT}$ of the rotor 14 is representative of the rotational speed of the sun gear 106, and is commensurate with the rotational speeds of the planet gears 108 and the ring gear 110.

The coolant 58 from the second axial fluid passages 70 and the coolant 58 from the through holes 88 are supplied respectively to the planetary gear mechanism 80. Therefore, the sun gear 106, the planet gears 108, the ring gear 110, the planetary carrier 114, the bearings 116, and the thrust washers 118 of the planetary gear mechanism 80 are lubricated and cooled by the coolant 58.

When the coolant 58, which is applied to the planetary gear mechanism 80, is scattered radially in directions indicated by the arrows Z1, Z2 in FIG. 2 under centrifugal forces generated by the planetary gear mechanism 80 as the planetary gear mechanism 80 operates, or more specifically, under centrifugal forces generated by the ring gear 110 as the ring gear 110 rotates, the scattered coolant 58 may be applied to the side wall 74 of the rotor 14. In FIGS. 2 and 4, as indicated by the broken-line arrows, the coolant 58 is scattered radially outward from the ring gear 110.

[Problems Solved by the Invention]

When the coolant 58 is scattered radially outward from the ring gear 110 and is applied to the rotor 14, heat from the coolant 58 is transferred to the rotor 14, which may possibly change, i.e., increase or decrease, the temperature $T_{ROT}$ of the rotor 14 (hereinafter referred to as a "rotor temperature $T_{ROT}$") including the magnets 16 thereof.

More specifically, when the planetary gear mechanism 80 is actuated upon rotation of the rotational shaft 60, a slippage loss (meshing loss) occurs between meshing surfaces of the sun gear 106 and the planet gears 108, as well as between meshing surfaces of the planet gears 108 and the ring gear 110. As described later, the meshing loss $W_R$ is proportional to a torque $T_{qMOT}$ that acts on the rotational shaft 60, for thereby rotating the sun gear 106, the planet gears 108, and the ring gear 110.

Furthermore, when the planetary gear mechanism 80 is actuated upon rotation of the rotational shaft 60, a rolling loss occurs between contact surfaces of the planet gears 108 and the bearings 116. In addition, sliding losses in the directions of the arrows X1, X2 occur between the planet gears 108, the bearings 116, and the thrust washers 118, as well as between the thrust washers 118 and the planetary carrier 114. The rolling loss and the sliding losses are referred collectively to as a frictional loss, due to friction that occurs between such components and the contact surfaces. The frictional loss $W_F$, with the rolling loss and the sliding losses included therein, is proportional to an exponent of the rotational speed $N_{MOT}$ of the rotational shaft 60 that rotates the gears (see FIG. 12).

The losses $W_F$, $W_R$ are converted into heat. When the converted heat is transferred to the coolant 58 applied to the planetary gear mechanism 80, the temperature of the coolant 58 rises. Therefore, upon rotation of the ring gear 110, when the coolant 58, the temperature of which has increased, is scattered radially outward and applied to the side wall 74 of the bottomed tubular member 62 of the rotor 14, heat from the coolant 58 is transferred to the rotor 14 as well as to the magnets 16 through the side wall 74 and the rotor yoke 78. As a result, the magnet temperature $T_{MAG}$, i.e., the rotor temperature $T_{ROT}$, increases, potentially leading to demagnetization of the magnets 16.

The technology disclosed in Japanese Patent No. 4572907 is concerned with estimating the magnet temperature $T_{MAG}$. However, as described in the "SUMMARY OF THE INVENTION", the disclosed technology does not take into consideration any effect that the coolant 58, which is scattered from the planetary gear mechanism 80 of the transmission 22 and applied to the rotor 14, has on the magnet temperature $T_{MAG}$. Therefore, even if the magnet temperature $T_{MAG}$ is estimated in accordance with the technology disclosed in Japanese Patent No. 4572907, the estimated magnet temperature $T_{MAG}$ tends to deviate significantly from the actual magnet temperature $T_{MAG}$, and hence the accuracy with which the magnet temperature $T_{MAG}$ is estimated tends to be low.

[Arrangement of Magnetic Temperature Estimating Apparatus]

According to the method of estimating a magnet temperature according to the present embodiment, as shown in FIG. 5, the magnet temperature $T_{MAG}$ is estimated while taking into consideration the effect that the coolant 58, which is scattered from the planetary gear mechanism 80, has on the magnet temperature $T_{MAG}$. The estimation is performed by an ECU (Electronic Control Unit) 120 that controls the vehicle 18 in its entirety.

As shown in FIG. 5, the magnet temperature estimating apparatus 10, which carries out the method of estimating a magnetic temperature according to the present embodiment, includes a voltage sensor 122 for detecting a voltage $V_{MOT}$ applied across the coils 96, and a current sensor 124 for detecting a current $I_{MOT}$ flowing through the coils 96. The voltage sensor 122 and the current sensor 124 are disposed in the rotary electric machine 12. The transmission 22 is combined with the resolver 38, which serves as a rotational speed sensor for detecting the rotational speed $N_{MOT}$ depending on the angular displacement of the rotor 14 and the rotational shaft 60, the temperature sensor 104, which detects the sensing temperature $T_{IN}$, and a torque sensor 126, which detects the torque $T_{qMOT}$ that acts on the rotor 14 and the sun gear 106 coupled to the rotational shaft 60.

Since the torque $T_{qMOT}$ can also be calculated from the current $I_{MOT}$ and the angular displacement of the rotor 14 and the rotational shaft 60, the torque sensor 126 may be dispensed with. The voltage sensor 122, the current sensor 124, the resolver 38, the temperature sensor 104, and the torque sensor 126 detect respective physical quantities sequentially, and supply respective analog signals, which are representative of the detected physical quantities, sequentially to the ECU 120.

The ECU 120 includes a loss calculator 128, a dissipation heat calculator 130, a magnet temperature calculator (magnet temperature estimator) 132, a motor controller 134, and a memory 136. The ECU 120 estimates the magnet temperature $T_{MAG}$ based on various parameters that are related to the planetary gear mechanism 80 of the transmission 22. More specifically, the parameters are the torque $T_{qMOT}$, a loss $W_T$ caused by the transmission 22, which includes the losses $W_F$, $W_R$, the rotational speed $N_{MOT}$, a flow rate q of the coolant 58, and the sensing temperature $T_{IN}$.

The memory 136 stores a loss map (see FIG. 10), which is representative of a relationship between the rotational speed $N_{MOT}$, the torque $T_{qMOT}$, and a loss $W_{MOT}$ caused by the rotary electric machine 12, a flow rate map (see FIG. 11), which is representative of a relationship between the rotational speed $N_{MOT}$ and the flow rate q, a frictional loss map (see FIG. 12), which is representative of a relationship between the rotational speed $N_{MOT}$ and the frictional loss $W_F$, and a meshing loss map (see FIG. 13), which is representative of a relationship between the torque $T_{qMOT}$ and the meshing loss $W_R$.

Figure 10:
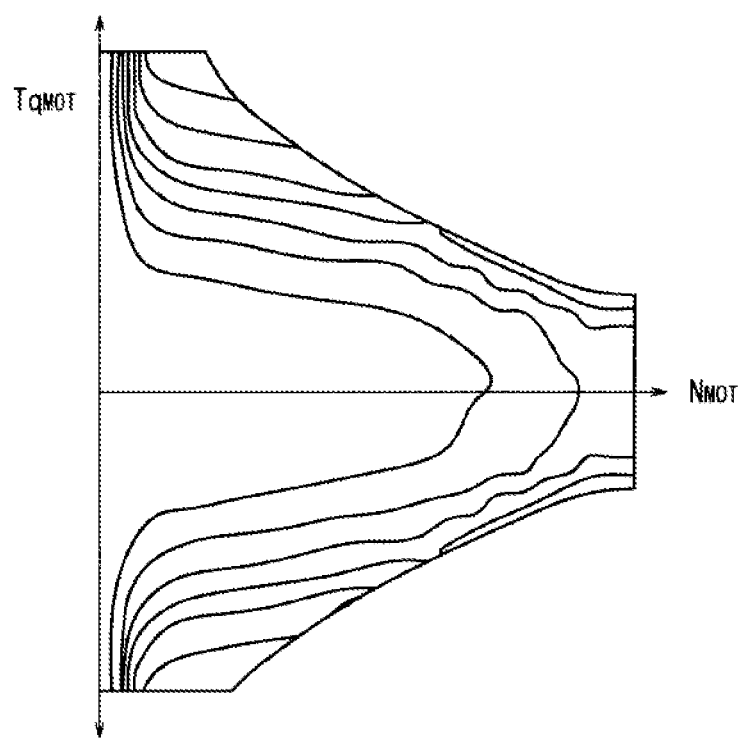
FIG. 10 is a diagram showing a loss map.

The loss calculator 128 reads the loss map shown in FIG. 10 from the memory 136, and by referring to the loss map, identifies a loss $W_{MOT}$ corresponding to the rotational speed $N_{MOT}$ based on the torque $T_{qMOT}$ and the angular displacement that is detected by the resolver 38.

The loss map shown in FIG. 10 represents data produced by measuring values of the loss $W_{MOT}$ and the rotational speed $N_{MOT}$ in advance. The loss map is illustrated as a contour map having solid-line curves that represent identical values of the loss $W_{MOT}$. The loss $W_{MOT}$ includes a loss caused by the rotor 14, which includes an eddy-current loss caused by the magnets 16 and an iron loss caused by the rotor yoke 78, and a loss caused by the stator 32, which includes a copper loss caused by the coils 96 and an iron loss caused by the stator core 92. More specifically, the aforementioned components of the rotary electric machine 12 serve as a heat source of the rotary electric machine 12. When losses caused by the components of the rotary electric machine 12 are converted into heat, the overall temperature of the rotary electric machine 12 increases. Since the rotor 14 and the stator 32 are spaced from each other by an air gap, heat transferred from the stator 32 to the rotor 14 is low. Therefore, the loss caused by the rotor 14, which includes the eddy-current loss caused by the magnets 16 and the iron loss caused by the rotor yoke 78, is primarily responsible for an increase in the magnet temperature $T_{MAG}$.

Figure 11:
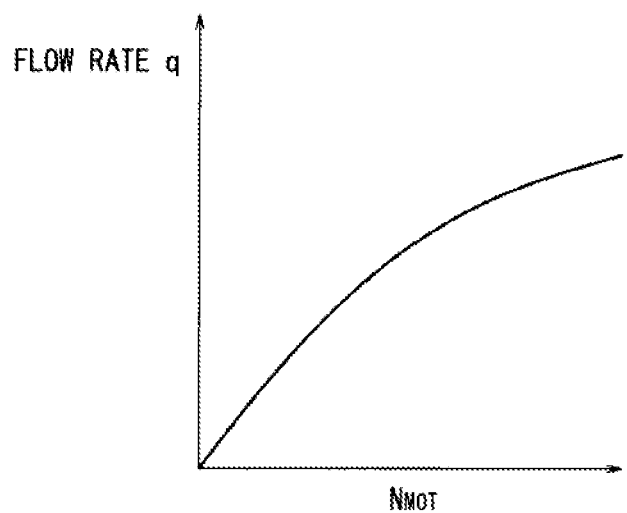
FIG. 11 is a diagram showing a flow rate map.

The flow rate map shown in FIG. 11 represents data produced by measuring beforehand values of the rotational speed $N_{MOT}$ and the flow rate q. In order to supply the coolant 58 to the side cover 42, the pump 56 is actuated at a rotational speed in synchronism with the rotational speed $N_{MOT}$. The flow rate q is regarded as the flow rate of the coolant 58, which is supplied from the pump 56 to the side cover 42 for cooling the rotary electric machine 12 and lubricating and cooling the transmission 22. Since the coolant 58, which is scattered from the planetary gear mechanism 80 and applied to the side wall 74 of the tubular member 62 upon rotation of the ring gear 110, is included as part of the coolant 58 supplied from the pump 56 to the side cover 42, the flow rate q includes the flow rate of the scattered coolant 58.

Figure 12:
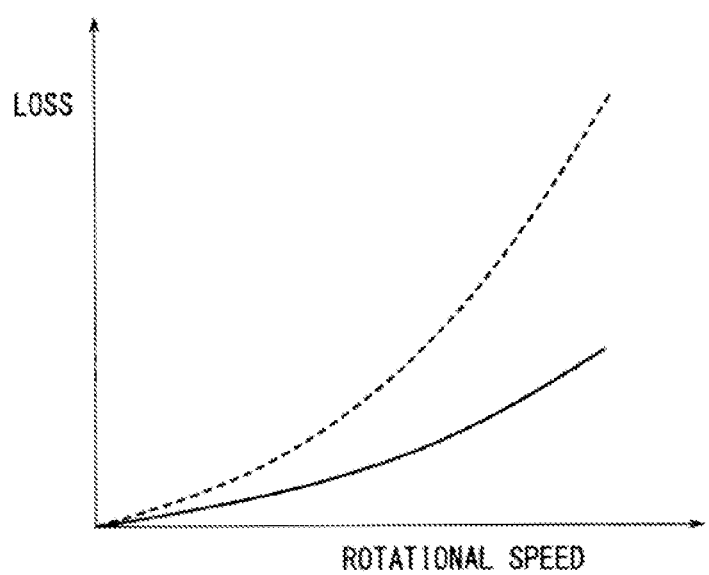
FIG. 12 is a diagram showing a frictional loss map.
Figure 13:
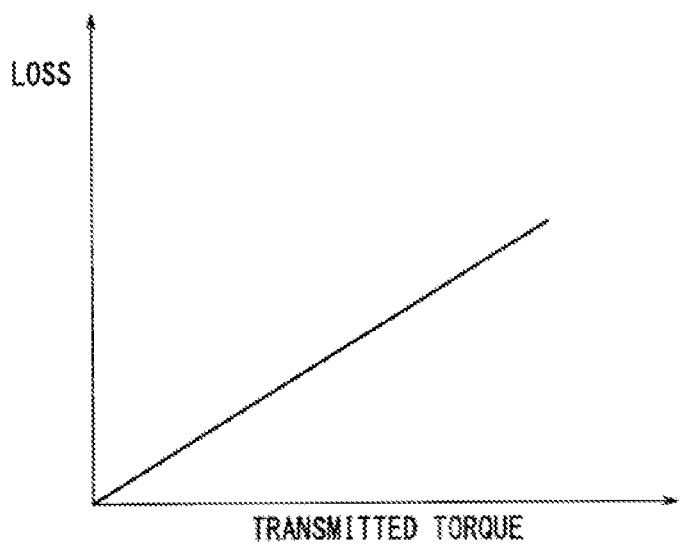
FIG. 13 is a diagram showing a meshing loss map.

The frictional loss map shown in FIG. 12 represents data produced by measuring in advance values of the rotational speed $N_{MOT}$ and the rolling loss indicated by the solid-line curve in FIG. 12, and the sliding loss indicated by the broken-line curve in FIG. 12. The sum of the rolling loss and the sliding loss is equal to the frictional loss $W_F$. The meshing loss map shown in FIG. 13 represents data produced by measuring beforehand values of the torque $T_{qMOT}$ and the meshing loss $W_R$.

In FIG. 5, the dissipation heat calculator 130 reads the flow rate map from the memory 136, and by referring to the flow rate map, identifies a flow rate q that corresponds to the calculated rotational speed $N_{MOT}$.

The dissipation heat calculator 130 also reads the frictional loss map and the meshing loss map from the memory 136, and by referring to the frictional loss map, identifies a frictional loss $W_F$ corresponding to the calculated rotational speed $N_{MOT}$. By referring to the meshing loss map, the dissipation heat calculator 130 also identifies a meshing loss $W_R$ corresponding to the torque $T_{qMOT}$.

Since, as described above, the frictional loss map shown in FIG. 12 represents rolling loss data and sliding loss data, the dissipation heat calculator 130 identifies a rolling loss and a sliding loss, which correspond to the rotational speed $N_{MOT}$, and the identified rolling loss and the identified sliding loss are added into a frictional loss $W_F$. According to the present embodiment, the torque $T_{qMOT}$ may be detected by the torque sensor 126, or may be calculated from the current $I_{MOT}$ and the angular displacement of the rotor 14 and the rotational shaft 60. The dissipation heat calculator 130 may also identify a meshing loss $W_R$ using the torque $T_{qMOT}$, which has either been detected or calculated.

The dissipation heat calculator 130 adds the calculated frictional loss $W_F$ and the calculated meshing loss $W_R$ into a loss $W_T$ caused by the transmission 22 ($W_T = W_F + W_R$). More specifically, the coolant 58, which is scattered from the planetary gear mechanism 80 and is applied to the side wall 74 of the tubular member 62, increases the rotor temperature $T_{ROT}$, i.e., the magnet temperature $T_{MAG}$, thereby adversely affecting dissipation of heat from the magnets 16. Consequently, the dissipation heat calculator 130 regards the loss ($W_F + W_R$) as a loss that is caused by the transmission 22, which adversely affects dissipation of heat from the magnets 16, and calculates ($W_F + W_R$) as the loss $W_T$.

The dissipation heat calculator 130 also calculates a dissipation heat quantity $Q_{MOT}$, which represents a quantity of heat that is dissipated into the coolant 58 from the magnets 16 of the rotor 14 of the rotary electric machine 12 upon application of the coolant 58 to the rotor 14. The dissipation heat quantity $Q_{MOT}$ is calculated according to the following equation (1), using a heat transfer ratio h(q) between the rotor 14 and the coolant 58 as a function of the flow rate q, a wetting area A representing an area of the coolant 58 applied to the rotor 14, the rotor temperature $T_{ROT}$, and the temperature $T_{OIL}$ of the coolant 58 (hereinafter referred to as a "coolant temperature $T_{OIL}$") immediately before heat is dissipated from the rotor 14 into the coolant 58.

$$Q_{MOT} = h(q) \times A \times (T_{ROT} - T_{OIL}) \quad (1)$$

The coolant temperature $T_{OIL}$ represents the temperature of the coolant 58, which is supplied from the side cover 42 to the transmission 22 and is scattered from the transmission 22 including the planetary gear mechanism 80 to the rotor 14, i.e., the temperature of the coolant 58 immediately before heat is dissipated from the rotor 14. Accordingly, as indicated by the following equation (2), the coolant temperature $T_{OIL}$ is expressed as the sum of the sensing temperature $T_{IN}$ and a temperature rise $\Delta T_{OIL}$ caused by the loss $W_T$ of the transmission 22.

$$T_{OIL} = T_{IN} + \Delta T_{OIL} \quad (2)$$

The temperature rise $\Delta T_{OIL}$ is expressed by the following equation (3), based on the relationship between the loss $W_T$ and a thermal capacity c×q (c: specific heat of the coolant 58) of the coolant 58.

$$\Delta T_{OIL} = W_T / (c \times q) \quad (3)$$

Consequently, the dissipation heat calculator 130 can calculate the dissipation heat quantity $Q_{MOT}$ by calculating the temperature rise $\Delta T_{OIL}$ according to equation (3), which takes into account the loss $W_T$, by substituting the calculated temperature rise $\Delta T_{OIL}$ in equation (2) in order to calculate the coolant temperature $T_{OIL}$, and by substituting the calculated coolant temperature $T_{OIL}$ in equation (1).

In equation (1), $(T_{ROT} - T_{OIL})$ represents a temperature difference between the rotor 14 and the coolant 58 immediately before heat is dissipated. The rotor temperature $T_{ROT}$ is calculated using the amount of heat generated by the rotor 14 and the thermal capacity of the rotor 14, or alternatively, is calculated according to equation (1) and a later-described equation (4), using an estimated magnet temperature $T_{MAG}$, e.g., a previously estimated magnet temperature $T_{MAG}$, to be described later.

Thus, the dissipation heat quantity $Q_{MOT}$ represents a quantity of heat dissipated from the magnets 16 by the coolant 58, which primarily is discharged from the through holes 88 and the second axial fluid passages 70, and is applied to the side wall 74, i.e., the coolant 58 applied along the route indicated by the solid-line arrows shown in FIG. 2. However, since heat is transferred to the rotor 14 from the coolant 58, which is scattered from the planetary gear mechanism 80 and applied to the side wall 74, i.e., the coolant 58 applied along the route indicated by the broken-line arrows shown in FIGS. 2 and 4, the dissipation heat calculator 130 calculates the dissipation heat quantity $Q_{MOT}$ in view of the effect of the scattered coolant 58 according to equations (1) through (3) above. Since the temperature rise $\Delta T_{OIL}$ is increased by the loss $W_T$, as indicated by equation (1), when the coolant temperature $T_{OIL}$ rises, the dissipation heat quantity $Q_{MOT}$ from the rotor 14 decreases.

The magnet temperature calculator 132 calculates a change $\Delta T_{MAG}$ in the magnet temperature $T_{MAG}$ (temperature change) according to the following equation (4). In equation (4), C represents the thermal capacity of the magnets 16 of the rotor 14.

$$\Delta T_{MAG} = (W_{MOT} - Q_{MOT})/C \quad (4)$$

Therefore, if the magnet temperature $T_{MAG}$ prior to operation of the rotary electric machine 12 already is known, or if the magnet temperature $T_{MAG}$ estimated by a preceding estimating process has been stored in the memory 136 beforehand, then the present magnet temperature $T_{MAG}$ can easily be calculated simply by adding the temperature change $\Delta T_{MAG}$ according to equation (4) to the magnet temperature $T_{MAG}$ prior to operation of the rotary electric machine 12, or to the previously estimated temperature $T_{MAG}$ (the magnet temperature $T_{MAG}$ prior to operation of the rotary electric machine 12 or the preceding magnet temperature $T_{MAG} + \Delta T_{MAG} \rightarrow$ the present magnet temperature $T_{MAG}$).

In order to control the rotary electric machine 12, the motor controller 134 supplies the PDU 30 with a control signal based on the estimated magnet temperature $T_{MAG}$ calculated by the magnet temperature calculator 132. The control signal is a signal that depends on operating points of the motor, i.e., the rotary electric machine 12, which includes a target torque (torque command value), the rotational speed $N_{MOT}$ of the rotor 14, and the current $I_{MOT}$ flowing through the coils 96, for example.

[Operation of Magnet Temperature Estimating Apparatus 10]

The magnet temperature estimating apparatus 10, which carries out the method of estimating a magnetic temperature according to the present embodiment, is constructed as described above. Next, operations of the magnet temperature estimating apparatus 10, i.e., a method of estimating a magnetic temperature, will be described.

Figure 6:
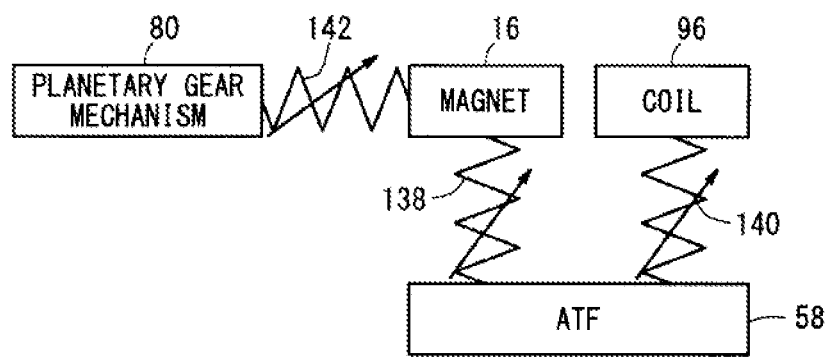
FIG. 6 is a schematic diagram showing a thermal model between the planetary gear mechanism, a magnet, a coil, and a coolant.

FIG. 6 is a schematic diagram showing a thermal model between the planetary gear mechanism 80, a magnet 16, a coil 96, and the coolant 58.

As described above, when the rotor 14 is cooled by the coolant 58, heat from the magnet 16 is discharged into the coolant 58 through the rotor yoke 78 and the side wall 74 of the tubular member 62. When the stator 32 is cooled by the coolant 58, heat from the coil 96 is discharged into the coolant 58. In terms of the thermal circuit, which includes the planetary gear mechanism 80, the magnet 16, the coil 96, and the coolant 58, a thermal resistance 138 exists between the magnet 16 and the coolant 58, and a thermal resistance 140 exists between the coil 96 and the coolant 58. Since the rotor 14 and the stator 32 are spaced from each other by the air gap, heat is not easily transferred between the rotor 14 and the stator 32, and hence thermal resistance is not considered to be present between the rotor 14 and the stator 32, i.e., the rotor 14 and the stator 32 are considered to be in a thermally isolated condition from each other.

Upon rotation of the ring gear 110 of the planetary gear mechanism 80, the coolant 58 applied to the planetary gear mechanism 80 is scattered under centrifugal forces, and the coolant 58 is applied to the side wall 74 of the tubular member 62. The scattered coolant 58 receives heat as a result of the loss $W_T$ caused by the planetary gear mechanism 80. Heat from the coolant 58 is transferred from the side wall 74 through the rotor yoke 78 to the magnet 16, thereby increasing the magnet temperature $T_{MAG}$. In terms of the thermal circuit, thermal resistance 142 also exists due to scattered coolant 58 between the planetary gear mechanism 80 and the magnet 16.

Figure 7:
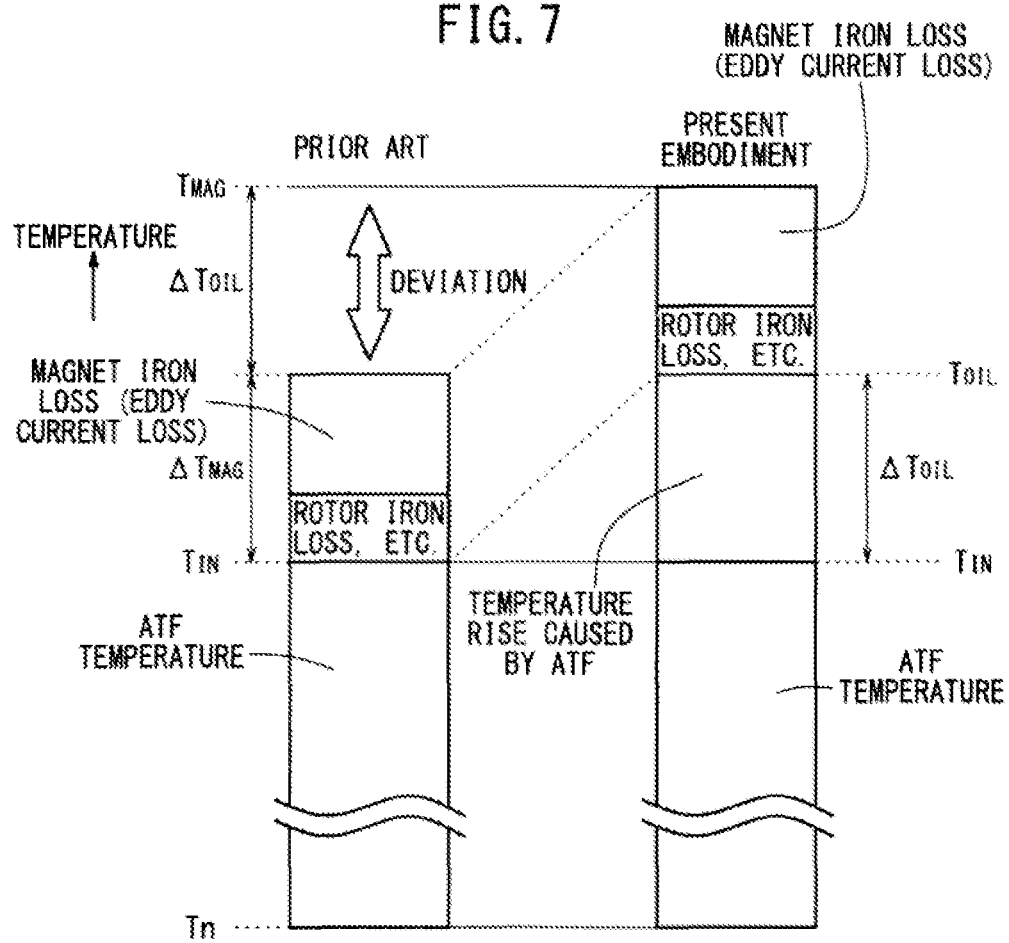
FIG. 7 is a diagram showing a difference between an estimated magnetic temperature according to the technology disclosed in Japanese Patent No. 4572907 and an estimated magnetic temperature according to the present embodiment.

FIG. 7 is a diagram showing the difference between estimation of a magnetic temperature $T_{MAG}$ according to the technology disclosed in Japanese Patent No. 4572907 and estimation of a magnetic temperature $T_{MAG}$ according to the present embodiment.

According to the technology disclosed in Japanese Patent No. 4572907, as described in the "SUMMARY OF THE INVENTION" section above as well as in the section [Problems to be Solved by the Invention], nothing is taken into account concerning the effect that the coolant 58, which is scattered from the planetary gear mechanism 80 and is applied to the rotor 14, has on the estimation of the magnet temperature $T_{MAG}$. In other words, the technology disclosed in Japanese Patent No. 4572907 estimates the magnet temperature $T_{MAG}$ without taking into account the thermal resistance 142 shown in FIG. 6.

As shown in FIG. 7, a temperature rise, which is caused by losses inside the rotor 14, such as an eddy current loss caused by the magnet 16 and an iron loss caused by the rotor yoke 78, is denoted by $\Delta T_{MAG}$.

According to the technology disclosed in Japanese Patent No. 4572907, insofar as nothing is taken into account concerning the scattered coolant 58, the estimated temperature is indicated by $(T_{IN}+\Delta T_{MAG})$, which deviates from the actual magnet temperature $T_{MAG}$ by the temperature rise $\Delta T_{OIL}$. According to the present embodiment, however, since an estimating process is carried out that takes into account the temperature rise $\Delta T_{OIL}$, the magnet temperature $T_{MAG}$ can be estimated more accurately with reduced error between the estimated magnet temperature and the actual magnet temperature $T_{MAG}$. In FIG. 7, $T_n$ represents the ambient temperature, e.g., normal temperature.

An operation sequence carried out by the magnet temperature estimating apparatus 10 for estimating a magnetic temperature $T_{MAG}$ according to the present embodiment shown in FIG. 7 will be described below with reference to FIGS. 8 through 13, as well as FIGS. 1 through 7 when necessary.

It is assumed that the rotary electric machine 12 operates as a motor when electric power is supplied from the battery 28, through the PDU 30, to the rotary electric machine 12.

When a voltage $V_{MOT}$ is applied across the coils 96 of the rotary electric machine 12, a current $I_{MOT}$ flows through the coils 96 that rotates the rotor 14, which in turn rotates the rotational shaft 60 coupled to the rotor 14, and the sun gear 106 mounted on the rotational shaft 60. As a result, the planet gears 108, which are held in mesh with the sun gear 106, are rotated about the gear shafts 112 and the bearings 116, thereby rotating the ring gear 110 that is held in mesh with the planet gears 108.

The voltage sensor 122 detects the voltage $V_{MOT}$ and supplies a detection signal thereof to the ECU 120. The current sensor 124 detects the current $I_{MOT}$ and supplies a detection signal thereof to the ECU 120. The resolver 38 detects the angular displacement of the rotor 14 and the rotational shaft 60, and supplies a detection signal thereof to the ECU 120.

The temperature sensor 104 detects the sensing temperature $T_{IN}$ of the coolant 58, which is maintained in the oil pan 98, and supplies a detection signal thereof to the ECU 120. The torque sensor 126 detects the torque $T_{qMOT}$ that acts on the rotational shaft 60, and supplies a detection signal thereof to the ECU 120.

Figure 8:
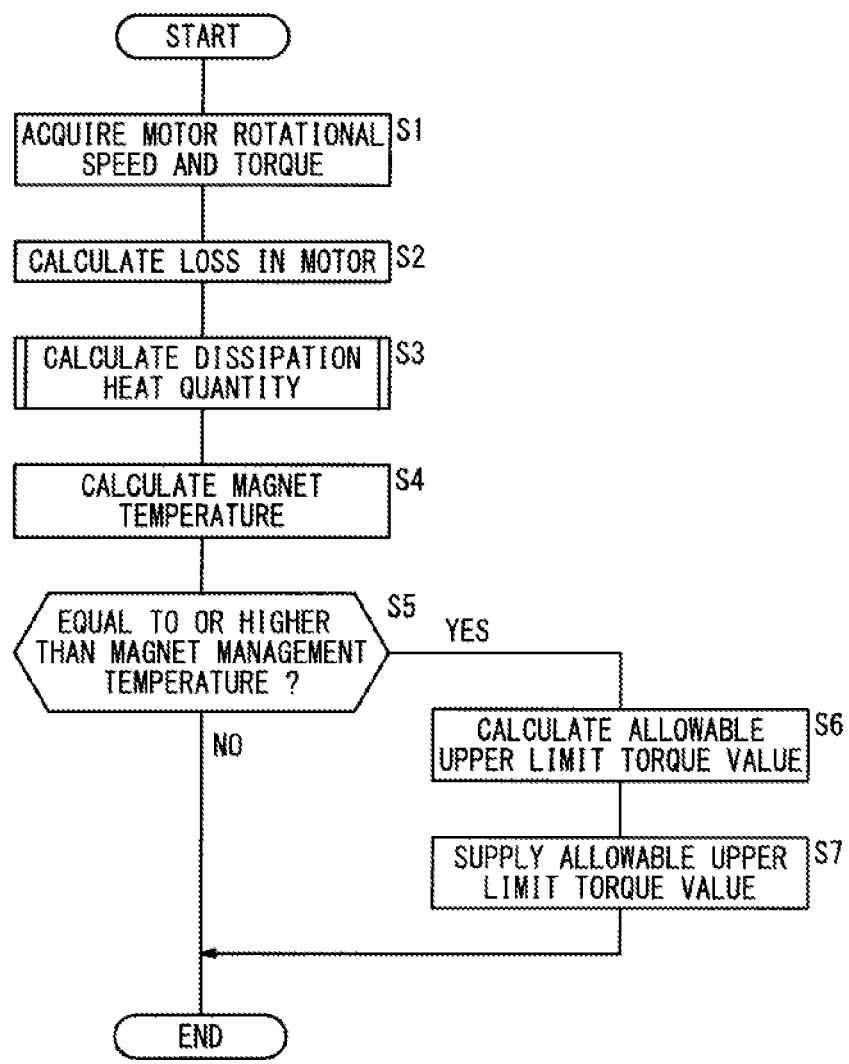
FIG. 8 is a flowchart of an operational sequence for estimating a magnet temperature according to the present embodiment.

In step S1 of FIG. 8, the ECU 120 acquires the voltage $V_{MOT}$, the current $I_{MOT}$, the angular displacement, the sensing temperature $T_{IN}$, and the torque $T_{qMOT}$ by reading respective detection signals supplied from the voltage sensor 122, the current sensor 124, the resolver 38, the temperature sensor 104, and the torque sensor 126. The ECU 120 also calculates the rotational speed $N_{MOT}$ of the rotor 14 and the rotational shaft 60 based on the angular displacement, which is represented by the detected signal supplied from the resolver 38.

The ECU 120 actuates the pump 56 at a rotational speed commensurate with the calculated rotational speed $N_{MOT}$. Upon actuation thereof, the pump 56 draws in the coolant 58 that is maintained in the oil pan 98, and supplies the coolant 58 to the side cover 42.

The coolant 58 supplied to the side cover 42 is ejected or discharged from the third outlet holes 52 in order to cool the stator 32. The coolant 58 supplied to the side cover 42 also is ejected or discharged from the second outlet hole 50 in order to cool the rotor 14 and to lubricate and cool the planetary gear mechanism 80. The coolant 58 supplied to the side cover 42 further is ejected or discharged from the first outlet hole 48 through the axial opening 68 into the first axial fluid passage 66, and then is discharged from the second axial fluid passages 70 in order to lubricate and cool the transmission 22 including the planetary gear mechanism 80.

At this time, the planetary gear mechanism 80 experiences a meshing loss $W_R$ between the sun gear 106 and the planet gears 108 as well as between the planet gears 108 and the ring gear 110, a rolling loss between the planet gears 108 and the bearings 116, and a sliding loss in the directions indicated by the arrows X1, X2 between the planet gears 108 and the bearings 116 and the thrust washers 118, as well as between the thrust washers 118 and the planetary carrier 114. The rolling loss and the sliding loss make up a frictional loss $W_F$ as a result of friction between contacting surfaces of the components of the planetary gear mechanism 80.

The losses $W_R$, $W_F$ are converted into heat, which is transferred to the coolant 58 that is applied to the planetary gear mechanism 80, thereby increasing the temperature of the coolant 58. Upon rotation of the ring gear 110, the coolant 58 that is applied to the planetary gear mechanism 80 is scattered radially outward and applied to the side wall 74 of the tubular member 62. The heat of the coolant 58, which is applied to the side wall 74, is then transferred through the side wall 74 and the rotor yoke 78, resulting in an increase in the magnet temperature $T_{MAG}$, which tends to demagnetize the magnets 16.

Figure 9:
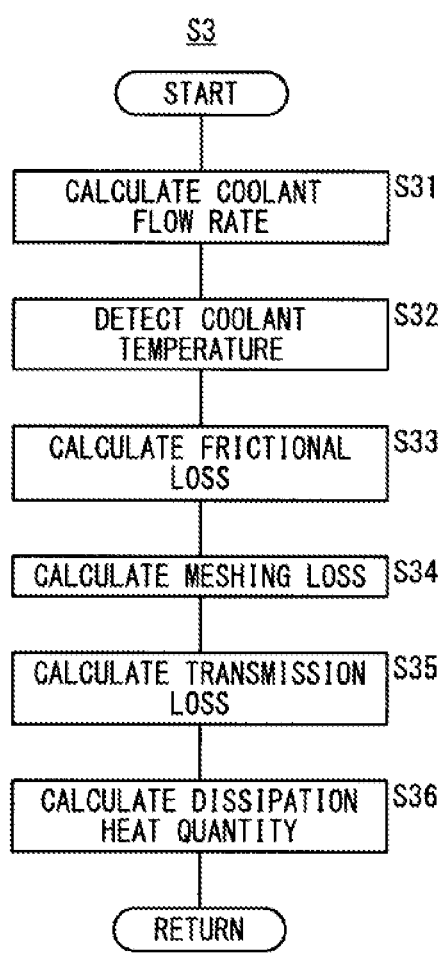
FIG. 9 is a flowchart of details of a process for calculating an amount of removed heat, as a subroutine of the sequence shown in FIG. 8.

According to the present embodiment, the operation sequence of FIG. 8, which takes place during and after step S2, and the process shown in FIG. 9 are carried out in order to estimate the magnet temperature $T_{MAG}$ accurately, and thereby appropriately manage the magnet temperature $T_{MAG}$ in order to minimize demagnetization of the magnets 16 owing to a rise in the magnet temperature $T_{MAG}$, and to allow the rotary electric machine 12 to operate at full performance.

More specifically, in step S2 of FIG. 8, the loss calculator 128 of the ECU 120 calculates a loss $W_{MOS}$ caused in the rotary electric machine 12, which operates as a motor. In greater detail, the loss calculator 128 reads the loss map shown in FIG. 10 from the memory 136, and using the loss map, identifies a loss $W_{MOS}$ corresponding to the torque $T_{qMOT}$ and the rotational speed $N_{MOT}$ acquired in step S1.

In step S3, the dissipation heat calculator 130 calculates a heat quantity (dissipation heat quantity $Q_{MOT}$), which represents a quantity of heat dissipated from the rotor 14 into the coolant 58 upon application of the coolant 58 to the rotor 14. As described above, while heat from the rotor 14 is discharged into the coolant 58 as the coolant 58 is supplied from the side cover 42 to the rotor 14, the heat generated by the loss (the meshing loss $W_R$ and the frictional loss $W_F$) caused in the planetary gear mechanism 80 is transferred from the coolant 58 to the rotor 14 as the coolant 58, i.e., the coolant 58 affected by the temperature rise $\Delta T_{OIL}$, which is scattered from the planetary gear mechanism 80, is applied to the rotor 14, thereby tending to increase the magnet temperature $T_{MAG}$. In other words, the dissipation heat quantity $Q_{MOT}$ is reduced.

As shown in the flowchart of FIG. 9, the dissipation heat calculator 130 calculates a dissipation heat quantity $Q_{MOT}$ while taking into account the effect of the coolant 58 that is scattered from the planetary gear mechanism 80.

In step S31 of FIG. 9, the dissipation heat calculator 130 reads the flow rate map shown in FIG. 11 from the memory 136, and using the flow rate map, identifies a flow rate q corresponding to the calculated rotational speed $N_{MOT}$ that was acquired in step S1.

The coolant 58, which has cooled the rotary electric machine 12, and the coolant 58, which has lubricated and cooled the transmission 22, drops by gravity into the oil pan 98 and is maintained in the oil pan 98. The sensing temperature $T_{IN}$ of the coolant 58 that is maintained in the oil pan 98 is affected by the heat dissipated from the rotary electric machine 12 and the heat dissipated from the transmission 22. The oil pan 98 also maintains the coolant 58 that was scattered from the planetary gear mechanism 80 and applied to the rotor 14, and which dropped into the oil pan 98 after having transferred heat, which depends on the loss in the planetary gear mechanism 80, to the rotor 14. Therefore, the sensing temperature $T_{IN}$ is affected by the temperature of the scattered coolant 58.

The temperature sensor 104 sequentially detects the temperature $T_{IN}$ of the coolant 58 maintained in the oil pan 98. In step S32, the ECU 120 again acquires the sensing temperature $T_{IN}$ detected by the temperature sensor 104. Information regarding the acquired sensing temperature $T_{IN}$ is supplied to the dissipation heat calculator 130.

In step S33, the dissipation heat calculator 130 reads the frictional loss map shown in FIG. 12 from the memory 136, and using the frictional loss map, identifies a rolling loss and a sliding loss corresponding to the rotational speed $N_{MOT}$ that was acquired in step S1. The dissipation heat calculator 130 calculates a frictional loss $W_F$ by adding the identified rolling loss and the identified sliding loss.

In step S34, the dissipation heat calculator 130 reads the meshing loss map shown in FIG. 13 from the memory 136, and using the meshing loss map, identifies a meshing loss $W_R$ corresponding to the torque $T_{qMOT}$ that was acquired in step S1.

In step S35, the dissipation heat calculator 130 adds the frictional loss $W_F$ calculated in step S33 and the meshing loss $W_R$ identified in step S34, and regards the sum as a loss $W_T$ caused by the transmission 22 ($W_F+W_R=W_T$).

In step S36, the dissipation heat calculator 130 calculates a dissipation heat quantity $Q_{MOT}$, which is dissipated from the rotor 14 through the coolant 58, according to the aforementioned equations (1) through (3).

In step S4 of FIG. 8, the magnet temperature calculator 132 calculates a change $\Delta T_{MAG}$ in the magnet temperature $T_{MAG}$ (temperature change) according to equation (4), and calculates a present magnet temperature $T_{MAG}$ by adding the magnet temperature $T_{MAG}$ prior to operation of the rotary electric machine 12, or the previously estimated magnet temperature $T_{MAG}$, to the calculated temperature change $\Delta T_{MAG}$ (preceding magnet temperature $T_{MAG}+\Delta T_{MAG} \rightarrow$ present magnet temperature $T_{MAG}$). The magnet temperature $T_{MAG}$ prior to operation of the rotary electric machine 12, or the previously estimated magnet temperature $T_{MAG}$, are stored in the memory 136, for example. The magnet temperature calculator 132 preferably stores the presently estimated magnet temperature $T_{MAG}$ in the memory 136.

In step S5, the motor controller 134 judges whether or not the magnet temperature $T_{MAG}$ has reached a limit temperature at which the magnets 16 may become demagnetized (magnet management temperature).

If the magnet temperature $T_{MAG}$ is lower than the magnet management temperature (step S5: NO), then the motor controller 134 judges that the magnets 16 are not demagnetized, and controls the PDU 30 in order to operate the rotary electric machine 12 continuously at the present torque operating points (the torque $T_{qMOT}$, the rotational speed $N_{MOT}$, the current $I_{MOT}$).

If the magnet temperature $T_{MAG}$ is equal to or greater than the magnet management temperature (step S5: YES), then the motor controller 134 judges that the magnets 16 may possibly be demagnetized. In step S6, the motor controller 134 calculates an allowable upper limit value for the torque $T_{qMOT}$ (allowable upper limit torque value). In step S7, the motor controller 134 supplies a control signal, which is representative of the calculated allowable upper limit torque value, to the PDU 30. The PDU 30 then controls the rotary electric machine 12 so that the torque $T_{qMOT}$ will not exceed the allowable upper limit torque value.

[Advantages of the Present Embodiment]

According to the present embodiment, as described above, the transmission 22 is disposed in the vicinity of the rotary electric machine 12, and lubricating oil of the transmission 22 is used as a coolant 58 to cool the rotary electric machine 12. The magnet temperature calculator 132 of the ECU 120 estimates a magnet temperature $T_{MAG}$ based on at least parameters that are related to losses caused by the transmission 22, which include the frictional loss $W_F$, the meshing loss $W_R$, the loss $W_T$, the rotational speed $N_{MOT}$, the torque $T_{qMOT}$, and the flow rate q.

If the rotary electric machine 12 is incorporated in a vehicle 18 such as a hybrid vehicle or an electric vehicle, then upon the coolant 58 from the planetary gear mechanism 80 of the transmission 22 being scattered and applied to the rotor 14, the rotor temperature $T_{ROT}$ including the magnet temperature $T_{MAG}$ is changed (increased or decreased). According to the present embodiment, the magnet temperature $T_{MAG}$ is estimated based on the above parameters related to the transmission 22, which take into consideration the heat of the coolant 58 that is scattered and applied to the rotor 14. In this manner, deviation of the estimated magnet temperature $T_{MAG}$ from the actual magnet temperature $T_{MAG}$ is minimized, thus making it possible to estimate the magnet temperature $T_{MAG}$ more accurately.

Since the accuracy with which the magnet temperature $T_{MAG}$ is estimated is increased, it is possible to lower the heat resistance (demagnetization resistance) of the magnets 16, thereby reducing the coercive force of the magnets 16. Consequently, the amount of dysprosium (Dy) contained in the magnets 16 can be reduced. Consequently, it is possible to manufacture a rotary electric machine 12 that meets various specifications, and in which the magnets 16 thereof are less expensive.

The rotary electric machine 12 may be controlled by a control system, in which the rotary electric machine 12 is required to enter a power save mode each time that the magnet temperature $T_{MAG}$ approaches a limit temperature (upper limit temperature). In such a control system, since the accuracy with which the magnet temperature $T_{MAG}$ is estimated is increased, the power save mode is prevented from being carried out unnecessarily, and the frequency at which the rotary electric machine 12 enters the power save mode is lowered. As a result, fuel consumption of the vehicle 18 is reduced during times that the vehicle 18 is placed under high loads, and the drivability and commercial value of the vehicle 18 are increased.

According to the present embodiment, the loss calculator 128 calculates a frictional loss $W_F$, a meshing loss $W_R$, and a loss $W_T$ of the transmission 22, which are parameters related to the transmission 22. The magnet temperature calculator 132 estimates a magnet temperature $T_{MAG}$ while taking into consideration the frictional loss $W_F$, the meshing loss $W_R$, and the loss $W_T$, which are related to the heat of the coolant 58 that is scattered and applied to the rotor 14. Accordingly, deviation of the estimated magnet temperature $T_{MAG}$ from the actual magnet temperature $T_{MAG}$ is minimized, thereby making it possible to estimate the magnet temperature $T_{MAG}$ more accurately.

The torque $T_{qMOT}$ also is a parameter that is related to the transmission 22. The loss calculator 128 calculates a meshing loss $W_R$ based on the torque $T_{qMOT}$. More specifically, since the gears of the planetary gear mechanism 80 rotate under the torque $T_{qMOT}$, the loss calculator 128 can calculate a meshing loss $W_R$ accurately based on the torque $T_{qMOT}$. The torque $T_{qMOT}$ may be detected by the torque sensor 126, or may be calculated from the current $I_{MOT}$ that flows through the coils 96, which is detected by the current sensor 124, and the angular displacement of the rotor 14. The loss calculator 128 can calculate a meshing loss $W_R$ accurately based on the torque $T_{qMOT}$, which is either calculated or detected.

The loss calculator 128 calculates a frictional loss $W_F$ based on the rotational speed $N_{MOT}$ of the rotor 14 and the rotational shaft 60, which depends on the rotational speeds of the gears of the planetary gear mechanism 80. More specifically, when the gears rotate, a frictional loss $W_F$ occurs in various parts of the planetary gear mechanism 80, which include peripheral regions of the gears. Further, as the rotational speed $N_{MOT}$ increases, the frictional loss $W_F$ increases, thereby increasing heat that is transferred to the coolant 58. Consequently, the frictional loss $W_F$ can be calculated easily and accurately by taking into account the rotational speed $N_{MOT}$, which is related to the heat of the coolant 58.

The flow rate q of the coolant 58, which includes an amount of coolant 58 that is scattered from the planetary gear mechanism 80 and applied to the rotor 14, also serves as a parameter related to the transmission 22. The dissipation heat calculator 130 calculates a flow rate q from the rotational speed $N_{MOT}$, and calculates a dissipation heat quantity $Q_{MOT}$ based on the flow rate q and the loss $W_T$. The magnet temperature calculator 132 estimates the magnet temperature $T_{MAG}$ based on the loss $W_{MOT}$ and the dissipation heat quantity $Q_{MOT}$. Accordingly, by taking into account the loss $W_{MOT}$ and the dissipation heat quantity $Q_{MOT}$, it is possible to further minimize deviation of the estimated magnet temperature $T_{MAG}$ from the actual magnet temperature $T_{MAG}$.

Although a preferred embodiment of the present invention has been shown and described in detail above, it should be understood that various changes and modifications may be made to the embodiment without departing from the scope of the invention as set forth in the appended claims.

What is claimed is:

1. A method of estimating the temperature of magnets on a rotating member of a rotary electric machine, comprising:
   when the rotary electric machine is cooled by a fluid that lubricates a power transmitting mechanism disposed near the rotary electric machine, estimating the temperature of the magnets using at least parameters related to an amount of heat which the fluid receives from the power transmitting mechanism when lubricating the power transmitting mechanism.

2. The method according to claim 1, wherein the parameters related to the amount of heat which the fluid receives from the power transmitting mechanism include a loss caused by the power transmitting mechanism; and
   a loss calculator calculates the loss caused by the power transmitting mechanism.

3. The method according to claim 2, wherein the loss caused by the power transmitting mechanism includes a meshing loss caused by gears of the power transmitting mechanism; and
   the loss calculator calculates the meshing loss caused by the gears.

4. The method according to claim 3, wherein the parameters related to the amount of heat which the fluid receives from the power transmitting mechanism include a torque that acts on the power transmitting mechanism; and
   the loss calculator calculates the meshing loss based on the torque.

5. The method according to claim 4, wherein the power transmitting mechanism is coupled to the rotating member; and
   the loss calculator calculates the torque based on the value of a current flowing through the rotary electric machine.

6. The method according to claim 2, wherein the loss caused by the power transmitting mechanism includes a frictional loss due to friction in the power transmitting mechanism; and
   the loss calculator calculates the frictional loss.

7. The method according to claim 6, wherein the parameters related to the amount of heat which the fluid receives from the power transmitting mechanism include rotational speeds of gears of the power transmitting mechanism; and
   the loss calculator calculates the frictional loss based on the rotational speeds of the gears.

8. The method according to claim 7, wherein the power transmitting mechanism is coupled to the rotating member; and
   the loss calculator calculates the frictional loss based on a rotational speed of the rotating member, which depends on the rotational speeds of the gears.

9. The method according to claim 2, wherein the parameters related to the amount of heat which the fluid receives from the power transmitting mechanism include an amount of the fluid that is scattered from the power transmitting mechanism and applied to the rotating member;
   a dissipation heat calculator calculates a quantity of heat dissipated from the magnets by the fluid applied to the rotating member, based on the scattered amount of the fluid and the loss caused by the power transmitting mechanism; and
   the magnet temperature estimator estimates the magnet temperature based on the calculated quantity of heat dissipated from the magnets.

10. The method according to claim 9, wherein the parameters related to the amount of heat which the fluid receives from the power transmitting mechanism include rotational speeds of gears of the power transmitting mechanism; and
    the dissipation heat calculator calculates the amount of the fluid that is scattered from the power transmitting mechanism based on the rotational speeds of the gears.

11. The method according to claim 10, wherein the power transmitting mechanism is coupled to the rotating member; and
    the dissipation heat calculator calculates the amount of the fluid that is scattered from the power transmitting mechanism based on a rotational speed of the rotating member, which depends on the rotational speeds of the gears.

12. The method according to claim 1, wherein the power transmitting mechanism is disposed radially inward of the rotating member, which is provided as an inner rotor.

* * * * *